United States Patent [19]

Fillunger et al.

[11] 4,079,187
[45] Mar. 14, 1978

[54] SUPERCONDUCTOR

[75] Inventors: Harald Fillunger, Vienna, Austria; Alfred Koch, Bremgarten; Reinhard Kurt Maix, Zurich; Gundolf Meyer, Birmenstorf, all of Switzerland

[73] Assignee: BBC Brown Boveri & Company Limited, Baden, Switzerland

[21] Appl. No.: 750,724

[22] Filed: Dec. 15, 1976

[30] Foreign Application Priority Data

Dec. 15, 1975 Switzerland ............ 16246/75

[51] Int. Cl.$^2$ .................................. H01B 12/00
[52] U.S. Cl. ........................ 174/15 S; 174/126 S; 174/128 S
[58] Field of Search ........... 174/15 S, 126 S, 128 S, 174/15 C; 29/599

[56] References Cited

U.S. PATENT DOCUMENTS

| 3,432,783 | 3/1969 | Britton et al. | 174/126 S |
| 3,618,205 | 11/1971 | Barber et al. | 174/126 S X |
| 3,625,662 | 12/1971 | Roberts et al. | 174/128 S |
| 3,643,001 | 2/1972 | Schaetti | 174/128 S X |
| 3,699,647 | 10/1972 | Bidault et al. | 174/128 S X |
| 3,983,521 | 9/1976 | Furuto et al. | 174/126 S X |

FOREIGN PATENT DOCUMENTS

| 1,130,464 | 10/1968 | United Kingdom | 174/128 S |
| 1,179,896 | 2/1970 | United Kingdom | 174/128 S |

OTHER PUBLICATIONS

Critchlow et al., *Multifilamentary Superconducting Composites*, Cryogenics, Feb. 1971, pp. 3–9.

*Primary Examiner*—Arthur T. Grimley
*Attorney, Agent, or Firm*—Toren, McGeady and Stanger

[57] ABSTRACT

A plurality of superconductive wires form a cable. In each wire a number of filaments of superconductive material are embedded in a matrix of normal electrically conductive material. The individual wires are connected by a thermally conductive joining medium whose melting point lies below that of the matrix and whose tensile and/or shear strength at the operating temperature of the superconductor is substantially equal to or greater than that of the matrix.

47 Claims, 13 Drawing Figures

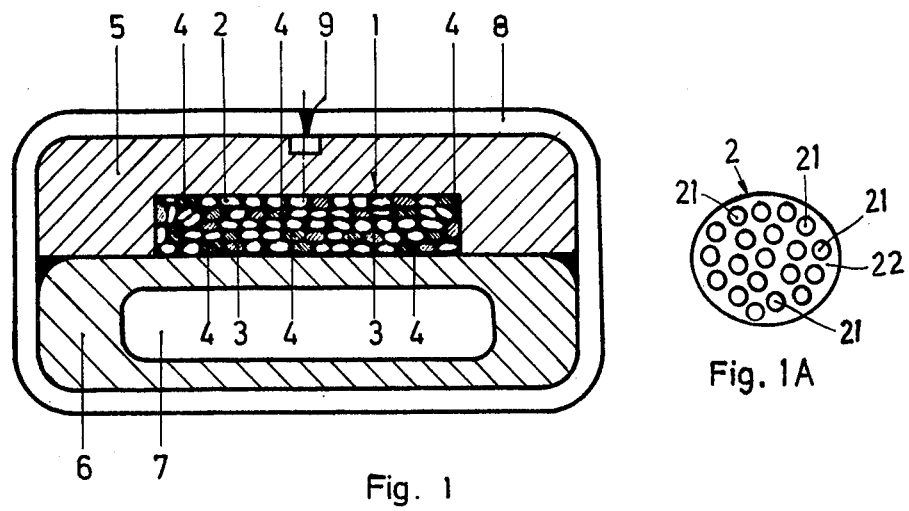
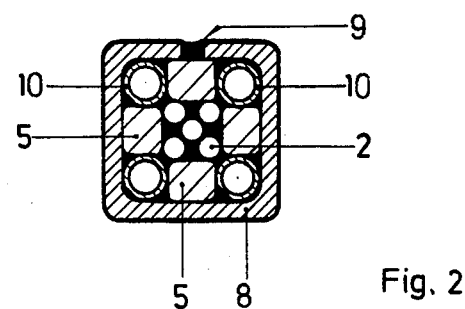
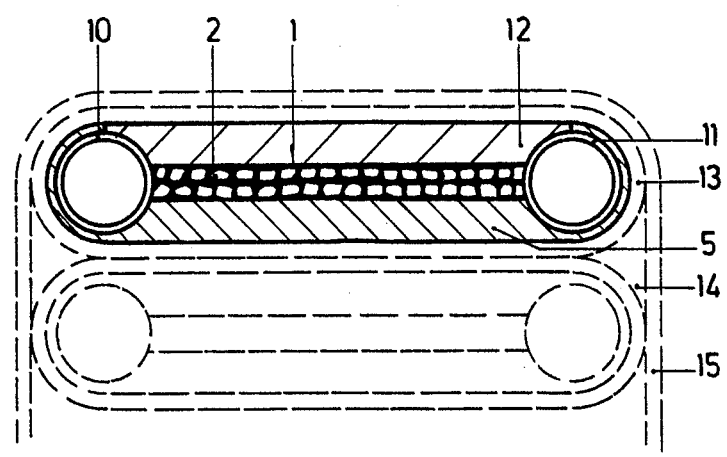

BUNCH STRANDING

CONCENTRIC STRANDING

CABLING

BRAIDED CONDUCTOR

SUPERCONDUCTOR

BACKGROUND OF THE INVENTION

This invention relates to superconductors and particularly to superconductive wires each of which is formed of a large number of superconductive filaments embedded in a matrix of normal electrically conductive material.

Nuclear fusion apparatuses require electrical conductors capable of carrying currents of up to 50,000 amperes and even more for generating magnetic fields with field strengths of up to 12 Tesla. The forces acting on electrical conductors carrying such currents are substantially higher than has hitherto been usual. Thus, superconductors which carry such currents must exhibit great mechanical strength.

An object of this invention is to improve superconductors.

Another object of the invention is to provide a mechanically stable and strong superconductor from superconductive wires.

SUMMARY OF THE INVENTION

According to a feature of the invention, the individual superconductive wires, each of which is composed of a large number of superconductive filaments embedded in a matrix of normal electrically conductive material, are connected together by a thermally conductive joining medium whose melting point lies below that of the matrix and whose shear and/or tensile strength at the operating temperature of the superconductor is substantially equal to or greater than that of the matrix, so as to form a cable.

According to another feature of the invention, the superconductive filaments are composed of one or more intermetallic A15 compounds such as, for example, $Nb_3Sn$, $V_3Ga$, or $V_3Si$.

According to another feature of the invention the joining medium is composed of a sufficiently strong hard solder or spelter, preferably a copper-silver hard solder, with a melting temperature in the range of 550° to 780° C.

According to another feature of the invention at least one cooling tube runs along the cable formed by the wires in thermally conductive relation with the wires and conducts a liquid coolant.

According to another feature of the invention, a highly conductive electrical material such as copper or aluminum extends along the superconductive wires for electrically stablizing the superconductor.

According to another feature of the invention, the matrix of the superconductive filaments is composed of strengthing and/or stablizing materials.

According to another feature of the invention, a support structure, including a stabilizing and strengthing material as well as one or more cooling tubes brazed together and to the wires, further increase the overall strength of the superconductor. The members of the support structure are brazed, hard soldered or welded together.

According to another feature of the invention the support structure includes a support member receiving the forces exerted by the cable and a stabilizing member, or a support member and a cooling portion, or a support member and a stabilizing member as well as a cooling member.

These and other features of the invention are pointed out in the claims. Other objects and advantages of the invention will become evident from the following detailed description when read in light of the accompanying drawings.

BRIEF DESCRIPTION OF THE DRAWINGS

FIG. 1 is a cross sectional view of a superconductor embodying features of the invention.

FIG. 1a is a cross sectional view of an individual wire of the superconductor in FIG. 1.

FIG. 2 is a cross sectional view of another superconductor embodying features of the invention.

FIGS. 3, 4, 5 and 6 are cross sectional views of still other superconductors embodying features of the invention.

DETAILED DESCRIPTION OF PREFERRED EMBODIMENTS

Figure 4:
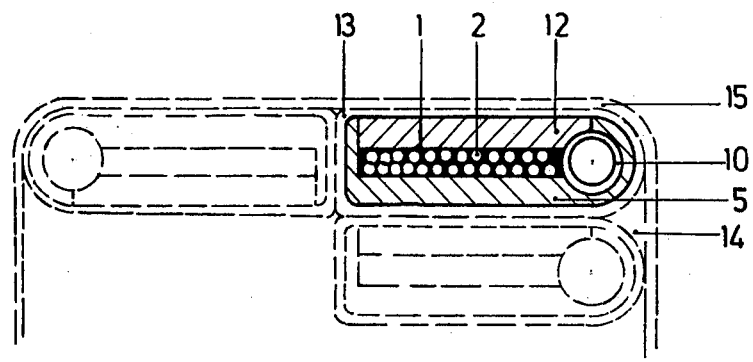

In the superconductor of FIG. 1, a plurality of superconductive wires 2 from a cable 1. As shown in FIG. 1a, each wire 2 is composed of a large number of filaments 21 of an A15 compound embedded in a matrix 22 of a normal electrically conductive material. According to different embodiments, the A15 compounds are $Nb_3Sn$, $V_3Ga$ and $V_3Si$. The matrix material is composed of alloys such as Cu-Sn for $Nb_3Sn$ filaments, Cu-Ga for $V_3Ga$ filaments, etc. According to other embodiments the matrix also includes a highly conductive material, such as copper or aluminum or both, for stabilization.

In addition to the superconductive wires, the cable also contains wires 3 of stabilizing material. Steel reinforcing wires 4 run parallel to the longitudinal axis of the cables to minimize the extensibility of the cable. A Cu-Ag hard solder with a shear strength of approximately 23 to 28 kg/mm² joins all the wires 2, 3, and 4 of the cable 1 together and forms a compact deformation-resistant component. The shear strength of the solder can be tested according DIN-standard 8525/2 resp. DIN-standard 8526. The processing time for the uniting of the wires of the cable and the melting point (approximately 700° C.) of the solder or spelter employed lies in a range which avoids deleteriously affecting the superconductive characteristics of the filaments 21 and which is e.g. less than one hour. The melting point of the matrix lies e.g. in the range of 800° to 1050° C.

Stabilizing members 5 and 6 electrically stabilize the superconductor. The members 5 and 6 extend along the length of the hard soldered cable 1 and are composed of a good electrically conductive material, such as copper or aluminum. One stabilizing member 6 forms a cooling duct 7 for carrying a coolant.

For improving its strength, the external periphery of the superconductor is completely enclosed in a steel sheath 8. The latter is welded along the seam 9.

The cable 1, the stabilizing members 5 and 6 and also the steel sheath are soldered or brazed together with hard solder or spelter and thus form a strong component that is suitable for the manufacture of magnet coils necessary for producing nuclear fusion.

In the embodiment illustrated in FIG. 2, five superconductive wires 2 are each composed of a number of filaments of superconductive material as shown in FIG. 1A. The wires are embedded in a material whose electrical conductivity is normal at the operating temperature of the superconductor. The wires are stranded together or transposed and fixedly joined by a copper-silver solder. As in the earlier embodiments, the superconductive material is composed of an intermetallic A15 compound such as $Nb_3Sn$, $V_3Ga$, or $V_3Si$. An alloy such as Cu-Sn, Cu-Ga, etc. is used as the normally electric conductive material for $Nb_3Sn$, $V_3Ga$, etc., respectively.

Four copper stabilizing wires 5 and four seamless drawn steel cooling tubes 10 further surround the cable 1 composed of the five superconductive wires 2. The tubes 10 conduct a cooling medium and reinforce and superconductor. A steel sheath 8 that is welded along its seam 10 encases the entire structure and further reinforces it.

FIG. 3 illustrates a further embodiment of a superconductor. Here, a flat cable 1 composed of superconductive wires 2 and two seamless drawn-steel tubes 10 and 11 extend along the narrow edges of the cable 1. The tubes 10 and 11 as well as the wires 2 are arranged between a stainless steel reinforcing member 12 and a stabilizing member 5 having a copper profile. All the members, including the superconductive wires 2 are hard soldered or brazed together by means of a copper-silver hard solder.

The cable 1 is composed of superconductive wires which are transposed among each other. In each, a large number of intertwined filaments of superconductive material are embedded in a matrix of normal electrically conductive material, such as for example, the aforementioned Cu-Sn or Cu-Ga alloys, or copper.

The superconductor in FIG. 3 is wound into a coil as shown by the broken lines. Conductor insulation encloses the superconductor. Shaped piece 15 composed of insulating material are laid between the individual turns. Packet insulation 15 surrounds the whole coil packet.

FIG. 4 illustrates another embodiment in which the superconductor is asymmetrical. In contrast to the superconductor of FIG. 3, the superconductor here includes only a single asymmetrically arranged cooling tube 10.

In FIG. 4, a flat cable 1 is composed of the superconductive wires 2. A drawn seamless cooling tube 10 runs along one of the narrow edges of the cable 1. A stainless steel reinforcing member 12 and a copper stabilizing member 5 embrace the wires 2 of the cable 1. To obtain a very strong structural arrangement all the assembled parts of the superconductor including the superconductive wires 2 are soldered together with hard solder or brazed with spelter.

The wires 2 of the cable 1 are mutually transposed. In each wire 2, a large number of intertwined filaments of superconductive material are embedded in a matrix of a normal electrically conductive material, such as for example, the aforementioned Cu-Sn and Cu-Ga alloys or copper.

In FIG. 4 a broken line shows how the superconductor is wound into a symmetrically constructed coil. Conductor insulation 13 encloses the superconductor. Shaped pieces of insulating material 14 are placed at the sides of the coil between the individual turns. The entire coil packet is provided with external packet insulation 15.

Figure 5:
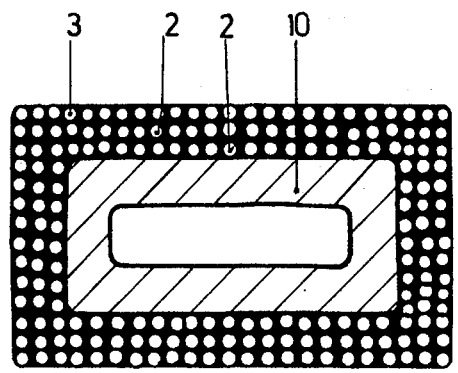

In the embodiment of FIG. 5, a seamless drawn cooling tube 10 forms the support structure about which are arranged the superconductive wires 2 of the cable 1. Here, the stabilizing wires 3 of normal electrically conductive material, such as copper, form the outmost layer of the superconductor. To obtain a strong structure all the members of the conductor are hard soldered or brazed together so that such a conductor is suitable for very high currents.

Figure 6:
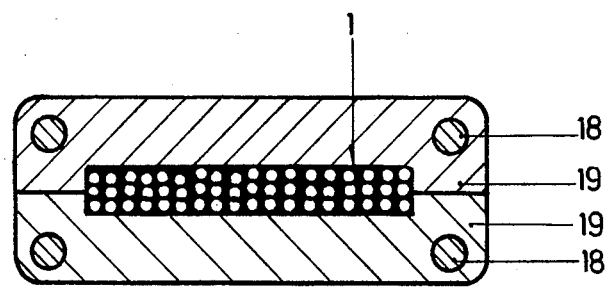

FIG. 6 illustrates another superconductor embodying the invention. Here, two similarly constructed sections 19, of copper or aluminum sandwich the cable 1 between them and electrically stabilize the superconductor. CuAl bronze reinforcing wires embedded in and metallurgically united with the sections 19 increase the mechanical strength of the two sections 19. The assembled elements of the illustrated semiconductor are hard soldered or brazed to each other for forming a structure which is mechanically strong. The reinforcing wires may be embedded by laying bronze rods in grooves and subsequently rolling or drawing or extruding them with the sections 19. At the same time thermodiffusion is used to metallurgically join the reinforcing materials with the stabilizing materials.

In all the described embodiments, whether or not this is specifically stated, the individual wires of the cable are connected together or united by a thermally conductive joining medium whose melting point is below that of the matrix in which the superconductive filaments are embedded and whose strength is the operating temperature of the superconductor is substantially equal to or higher than that of the matrix.

Figure 9:
FIGS. 9, 10, 11 and 12 are perspective views of different embodiments of the cable.
Figure 10:
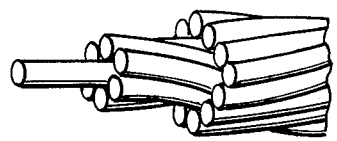
Figure 11:
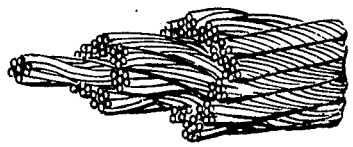
Figure 12:
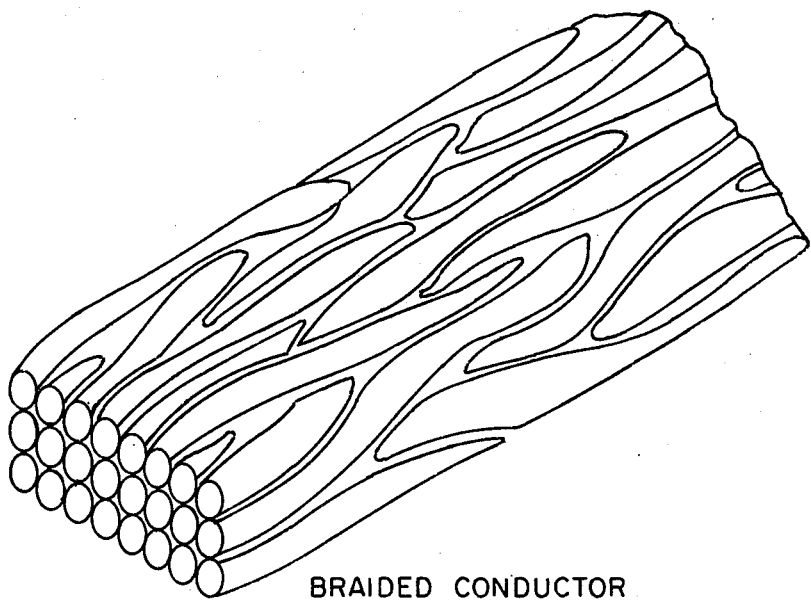

Also, according to an embodiment of the invention, the wires 2 of the cable 1 are cabled (FIG.11), stranded (FIGS.9 and 10, or braided (FIG.12) together, and/or are transposed along the length of the cable. If in a superconductive wire the superconductive filaments are transposed, then this means, that every superconductive filament takes in every position in the cross section of the superconductive wire as much as the other superconductive filaments.

If in a superconductor all wires are transposed, then this means, that every wire takes in every position in the cross section of the superconductor as much as the other wires.

The term "transposed" is well known in the field of superconductors and also described in the literature of superconductors.

Figure 7:
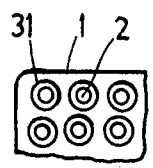
FIG. 7 is a cross sectional view of a portion of another superconductor embodying features of the invention.
Figure 8:
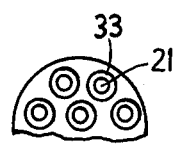
FIG. 8 is a cross sectional view of a portion of a wire in a superconductor embodying features of the invention.

According to another embodiment of the invention, the wires 2 are surrounded by high resistance CuNi alloy layers 31 as shown in FIG. 7. According to another embodiment of the invention, high resistance CuNi-alloy layers 33 are arranged between the filaments 21 of FIG. 1a. This is shown in FIG. 8.

According to an embodiment of the invention, the cable containing the superconductive wires is arranged so that when the superconductor is bent, the cable is concentric about a neutral surface. The cross section and the nature of the reinforcing material employed is sufficient so that, during construction, processing, and operation of the superconductor, the superconductive filaments 21 are not subjected to extensions exceeding 0,2%.

The invention avoids the disadvantage inherent in A15 compounds, namely that after being subjected to the reaction heat they are very brittle and can be bent or stretched only slightly without deleteriously affecting the electrical conductivity of the superconductor.

According to another embodiment the members 5 are separated from each other by high resistance CuNi-alloy layers.

According to the invention, the melting point and the processing time necessary for uniting the superconductive wires are in a range so as not to deleteriously affect the superconductive characteristics of the superconductive filaments 21.

The cooling tubes running along the cable formed by the wires and in thermally conductive relation with the cable serve to cool the superconductor to its operating temperature.

According to another aspect of the invention, in all of these embodiments, the material of the reinforcing members 8, 10 and 12 has a tensile strength at least 50% higher than that of the matrix. According to still another embodiment, the matrix of the earlier embodiments includes reinforcing material or stabilizing material or both. The reinforcing material is embedded in the matrix. Preferably the reinforcing material is metallurgically bonded to the matrix. The wires forming the cable are cabled, stranded or braided.

Preferably, in each of these embodiments, the bonding material has a melting temperature higher than the temperature of reaction heating.

While embodiments of the invention have been disclosed in detail, it will be evident to those skilled in the art that the invention may be embodied otherwise without departing from its spirit and scope.

What is claimed is:

1. A superconductor, comprising a plurality of superconductive wires forming a cable, each of said wires having a plurality of superconductive filaments and a matrix of normal electrically conductive material, the plurality of filaments in each of said wires being imbedded in the matrix of each of the wires, supporting means for supporting and strengthening the cable, said supporting means for supporting and strengthening cables including a thermally conductive joining medium connecting the individual wires and having a melting point below that of the matrix and a shear and/or tensile strength at the superconductor operating temperature substantially equal or greater than that of the matrix.

2. A superconductor as in claim 1, wherein the joining medium is a hard solder or spelter with a melting point in the range of 550° to 780° C.

3. A superconductor as in claim 2, wherein the joining medium is a copper-silver hard solder.

4. A superconductor as in claim 1, wherein the joining medium exhibits a melting point and a processing time for the uniting of the wires of the cable within a range to maintain the superconductive characteristics of the superconductive filaments.

5. A superconductor as in claim 2, wherein, the joining medium exhibits a melting point and a processing time for the uniting of the wires of the cable within a range to maintain the superconductive characteristics of the superconductive filaments.

6. A superconductor as in claim 3, wherein, the joining medium exhibits a melting point and a processing time for the uniting of the wires of the cable within a range to maintain the superconductive characteristics of the superconductive filaments.

7. A superconductor as in claim 1, wherein said support means includes a cooling tube extending along the cable formed by the wires and in thermally conductive connection with the wires for conducting a cooling medium.

8. A superconductor as in claim 2, wherein, said support means includes a cooling tube extending along the cable formed by the wires and in thermally conductive connection with the wires for conducting a cooling medium.

9. A superconductor as in claim 3, wherein said support means includes a cooling tube extending along the cable formed by the wires and in thermally conductive connection with the wires for conducting a cooling medium.

10. A superconductor as in claim 4, wherein, said support means includes a cooling tube extending along the cable formed by the wires and in thermally conductive connection with the wires for conducting a cooling medium.

11. A superconductor as in claim 7, wherein the cable encloses the cooling tube.

12. A superconductor as in claim 4, wherein the cable encloses the cooling tube.

13. A superconductor as in claim 1, wherein said supporting means includes stabilizing means for electrically stabilizing the cable and including electrically highly conductive material extending along the cable containing the superconductive wires.

14. A superconductor as in claim 4, wherein, said supporting means includes stabilizing means for electrically stabilizing the cable and including electrically highly conductive material extending along the cable containing the superconductive wires.

15. A superconductor as in claim 1, wherein said supporting means includes reinforcing means extending along the cable for increasing the tensile strength of the superconductor, said supporting means having a tensile strength at least 50% higher than that of the matrix.

16. A superconductor as in claim 4, wherein said supporting means includes reinforcing means extending along the cable for increasing the tensile strength of the superconductor, said supporting means having a tensile strength at least 50% higher than that of the matrix.

17. A superconductor as in claim 7, wherein, said supporting means includes reinforcing means extending the cable for increasing the tensile strength of the superconductor, said supporting means having a tensile strength at least 50% higher than that of the matrix.

18. A superconductor as in claim 11, wherein said supporting means includes reinforcing means extending the cable for increasing the tensile strength of the superconductor, said supporting means having a tensile strength at least 50% higher than that of the matrix.

19. A superconductor as in claim 13, wherein said supporting means includes reinforcing means extending along the cable for increasing the tensile strength of the superconductor, said supporting means having a tensile strength at least 50% higher than that of the matrix.

20. A superconductor as in claim 1, wherein the matrix of the superconductive wires includes reinforcing material.

21. A superconductor as in claim 1, wherein said matrix of the superconductive wires includes stabilizing material.

22. A superconductor as in claim 21, wherein the reinforcing material is embedded in the matrix.

23. A superconductor as in claim 22, wherein the reinforcing material is metallurgically bonded to the matrix.

24. A superconductor as in claim 1, wherein the cable further includes at least one of a stabilizing and reinforcing wire extending parallel with the longitudinal axis of the cable.

25. A superconductor as in claim 4, wherein the cable further includes at least one of a stabilizing and reinforcing wire extending parallel with the longitudinal axis of the cable.

26. A superconductor as in claim 7, wherein the cable further includes at least one of a stabilizing and reinforcing wire extending parallel with the longitudinal axis of the cable.

27. A superconductor as in claim 13, wherein the cable further includes at least one of a stabilizing and reinforcing wire extending parallel with the longitudinal axis of the cable.

28. A superconductor as in claim 15, wherein the cable further includes at least one of a stabilizing and reinforcing wire extending parallel with the longitudinal axis of the cable.

29. A superconductor as in claim 1, wherein the wires forming the cable are juxtapositioned in one of a cabled, stranded, braided, and/or transposed relationship.

30. A superconductor as in claim 19, wherein the wires forming the cable are juxtapositioned in one of a cabled, stranded, braided, and/or transposed relationship.

31. A superconductor as in claim 24, wherein the wires forming the cable are juxtapositioned in one of a cabled, stranded, braided, and/or transposed relationship.

32. A superconductor as in accordance with claim 1, wherein said support means includes a support structure and is hard-soldered to the adjacent parts of the supporting structure.

33. A superconductor as in claim 1, wherein the melting temperature of the bonding material is higher than the temperature of the reaction heating.

34. A superconductor as in claim 1, wherein said cable includes a high-resistance layer surrounding superconductive wires.

35. A superconductor as in claim 1, wherein said cable includes a high resistance layer surrounding the filaments.

36. A superconductor as in claim 11, wherein the stabilizing material includes a plurality of wires separated by a high resistance layer.

37. A superconductor as in claim 34, wherein the high resistance layer is a copper-nickel alloy.

38. A superconductor as in claim 36, wherein the high resistance layer is a copper-nickel alloy.

39. A superconductor as in claim 1, wherein the superconductive material consists of an intermetallic A15 compound.

40. A superconductor as in claim 39, wherein the compound consists of one of $Nb_cSn$, $V_3Ga$ or $V_3Si$.

41. A superconductor as in claim 15, wherein the reinforcing material consists of alloy steel, or an alloy based upon or consisting of copper-aluminum, copper-gallium, copper-tin or copper-nickel.

42. A superconductor as in claim 15, wherein the reinforcing material includes an alloy having a compound consisting of copper-aluminum, copper-gallium, copper-tin or copper-nickel.

43. A superconductor as in claim 15, wherein the reinforcing material consists of copper-aluminum, copper-gallium, copper-tin or copper-nickel.

44. A superconductor as in claim 1, wherein the superconductor includes a neutral surface and the cable is concentric about the neutral surface of the superconductor when bent.

45. A superconductor as in claim 1, wherein the cross section and the nature of the reinforcing material are such that during the construction, processing and operation of the superconductor the superconductive filaments are subjected to an extension of 0.2% or less.

46. A superconductor as in claim 7, wherein said supporting means includes stabilizing means for electrically stabilizing the cable and including electrically highly conductive material extending along the cable containing the superconductive wires.

47. A superconductor as in claim 11, wherein said supporting means includes stabilizing means for electrically stabilizing the cable and including electrically highly conductive material extending along the cable containing the superconductive wires.

* * * * *